United States Patent [19]

Stovall

[11] 4,000,618
[45] Jan. 4, 1977

[54] SKIMMER FENCE
[75] Inventor: Leland F. Stovall, Corpus Christi, Tex.
[73] Assignee: Exxon Production Research Company, Houston, Tex.
[22] Filed: Apr. 28, 1975
[21] Appl. No.: 572,556
[52] U.S. Cl. .................. 61/1 F; 256/12.5
[51] Int. Cl.² ........................ E02B 3/00
[58] Field of Search ............ 61/1 F, 3, 4, 5, ; 256/12.5

[56] References Cited
UNITED STATES PATENTS

| | | | |
|---|---|---|---|
| 762,727 | 6/1904 | Landenberger | 61/4 |
| 1,397,025 | 11/1921 | White | 61/5 |
| 2,826,382 | 3/1958 | Hagden | 256/12.5 X |
| 3,011,316 | 12/1961 | Wilson | 61/4 |
| 3,080,937 | 3/1963 | Garbell | 256/12.5 X |
| 3,473,786 | 10/1969 | Luebke | 256/12.5 |
| 3,785,159 | 1/1974 | Hammond | 61/1 F X |

Primary Examiner—Dennis L. Taylor
Attorney, Agent, or Firm—John S. Schneider

[57] ABSTRACT

A pollution containment fence or barrier retains petroleum products, or other floatable material, from a flowing stream of liquid. The barrier includes a series of vertically "stacked" baffles. When in operating position the barrier extends across the breadth of the stream and to any desired distance above and below the surface of the liquid. The baffles are spaced apart with each baffle overlapping a portion of the baffle or baffles adjacent to it to form a passageway between each baffle for flow of the liquid stream through the barrier. In cross section each baffle may comprise two straight members perpendicular to and extending in opposite directions to a third straight member or each baffle may comprise a semicircle in cross section.

3 Claims, 8 Drawing Figures

U.S. Patent  Jan. 4, 1977  4,000,618
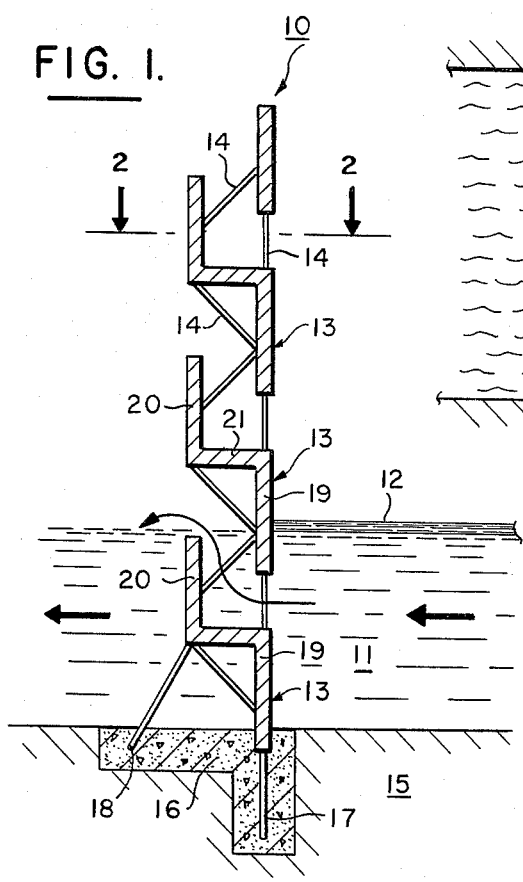
FIG. 1.
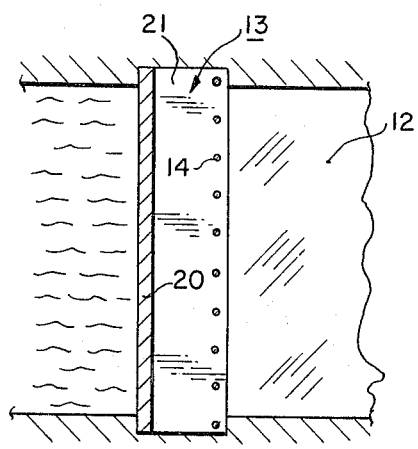
FIG. 2.
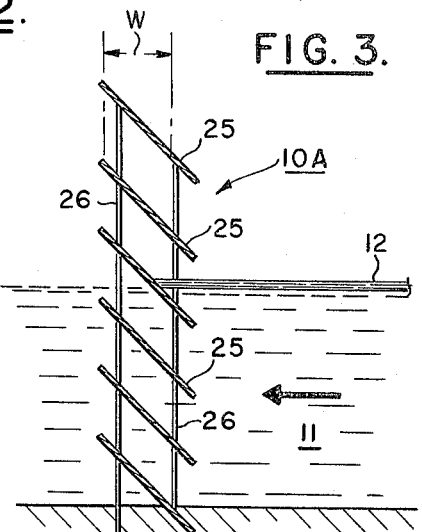
FIG. 3.
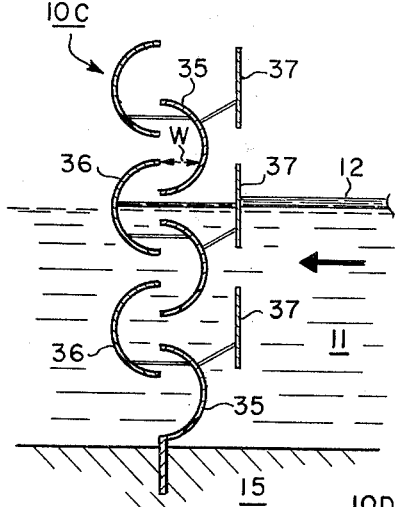
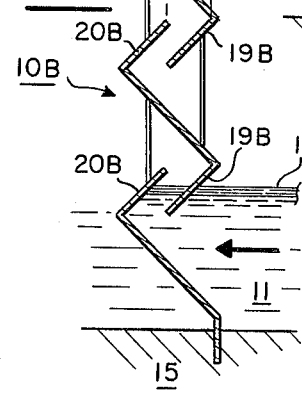
FIG.6
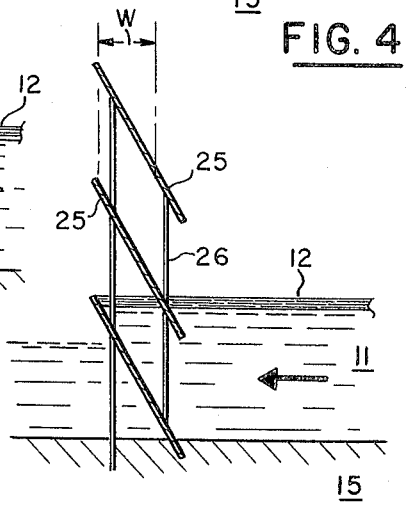
FIG. 4.
FIG. 5.
FIG. 7.
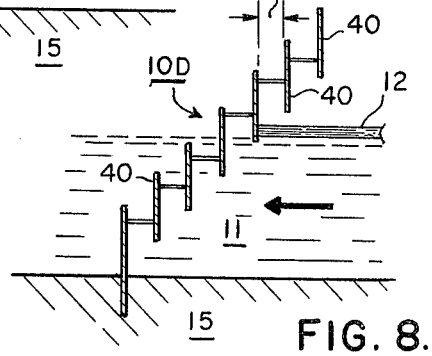
FIG. 8.

SKIMMER FENCE

BACKGROUND OF THE INVENTION

1. Field of the Invention

The present invention concerns a barrier for use in a flowing stream of liquid for accumulating floating material so that such material can be easily removed from the flowing liquid stream. The barrier may be used as a safeguard in locations, such as ravines or drainage ditches, which are normally dry but which might occasionally contain a flowing stream.

2. The Prior Art

Various devices designed to skim or control floating contaminants in a flowing liquid stream are known. However, none of those devices is designed to skim or control a flowing liquid stream which may vary in depth from very shallow to deep water. The apparatus of the present invention has that capability.

SUMMARY OF THE INVENTION

Briefly, the present invention concerns barrier apparatus for removing from a flowing stream of liquid material floating thereon which comprises a plurality of connected, vertically arranged baffles. Each baffle is spaced from and overlaps an adjacent baffle or baffles and forms a liquid flow passageway between each baffle. When the liquid stream overflows the uppermost edge of any baffle, the floating material is retained by the next higher positioned adjacent baffle. Modifications include different configurations for the baffles.

BRIEF DESCRIPTION OF THE DRAWINGS

FIG. 1 is a schematic illustration of one type of barrier in accordance with the invention;

FIG. 2 is a view taken on lines 2—2 of FIG. 1;

FIG. 3 is another schematic illustration of the barrier of FIG. 1;

FIG. 4 is a schematic illustration of another embodiment in accordance with the invention;

FIG. 5 is a schematic illustration of the embodiment of FIG. 4 slightly altered.

FIG. 6 is a schematic illustration of another embodiment of the present invention;

FIG. 7 is a schematic illustration of still another embodiment of the present invention; and FIG. 8 is a schematic illustration of a further embodiment of the present invention.

DESCRIPTION OF THE PREFERRED EMBODIMENTS

As shown in FIG. 1 a barrier, generally designated 10, is positioned in a stream of liquid 11 flowing in the direction of the arrowed lines. The stream contains a floating layer 12 of oil or other petroleum product or any contaminant it is desired to remove from stream 11. Barrier 10 includes a series of vertically arranged or stacked baffles, each designated 13, connected together by structural support members 14, two of which, 17–18, are secured to the land 15 under the water 11 in cement 16. As also shown in FIGS. 2 and 3 each baffle 13 forms a "step" extending across the stream having two parallel spaced apart vertical members 19 and 20 connected together by a horizontal member 21. Each member 19 of one baffle overlaps the member 20 of an adjacent baffle (except for the lowermost member 19. Also, the uppermost baffle may be a sole member 19, as shown.) The distance separating member 19 of one baffle from member 20 of an adjacent baffle, indicated w in FIG. 3, is preselected in accordance with the conditions under which the barrier is to be used. As the flow stream rises the only amount of floating material which flows over member 20 of each baffle is that contained in the space defined by width w. The height h, indicated in FIG. 3, of member 19 and the distance separating each member 19 are also preselected in accordance with the conditions of the flow stream expected to be encountered. As an example, each member 19, 20 and 21 may be formed of wood boards 2 inches by 12 inches and h and w may each be 6 inches long.

The modification of the barrier (10A) as seen in FIG. 4, includes a series of vertically arranged, straight, parallel baffles 25 extending across the flow stream. Baffles 25 are connected together by suitable structural supports 26. In FIG. 5 a similar barrier is shown in which baffles 25 are arranged in a more vertical position. The overflow width w is shown in FIGS. 4 and 5.

In FIG. 6 baffles 30 of the barrier (10B) are shaped, in general, as baffles 13 of FIG. 1. However, connecting member 21B is at an angle to the horizontal plane. It is also longer than member 21 of FIG. 1. Members 19B and 20B overlap and form an opening width w as shown.

In FIG. 7 the barrier (10C) includes a series of overlapping semicylindrical baffles 35, 36 connected together and arranged in vertical "steps" as shown. The overflow width w between baffles 35, 36 is indicated. In addition, a number of vertically spaced straight baffles 37 may be arranged upstream of baffles 35, 36, preferably in front of and covering the openings between baffles 35.

In the barrier (10D) of FIG. 8 a series of vertically arranged straight, vertically, positioned baffles 40 are connected together to form overflow spaces w as shown.

Each embodiment operates in substantially the same way. The material floating on the surface of the water will be trapped by the baffles as the water rises. The amount of such material which is permitted to pass through the barrier at each overflow level of the barrier is only that in space w.

The spacing of the baffles, the upstream and downstream openings, the angle of the baffles to the flow stream are chosen to meet conditions under which the barrier is to operate. The barrier may be built of any material, such as, for example, wood, metal, plastic, etc., that will not dissolve in the liquid stream.

Changes and modifications may be made in the illustrative embodiments of the invention shown and/or described herein without departing from the spirit of the invention as defined in the appended claims.

Having fully described the apparatus, method of operation, advantages and objects of our invention, I claim:

1. Apparatus for removing a layer of oil floating on a substantially level unidirectional flowing stream of water from said stream comprising:
    a plurality of water impervious baffles connected together in a vertical arrangement; each baffle overlapping in a vertical plane a selected portion of an adjacent baffle to form a plurality of flow passageways between each baffle, each passageway defining a selected overflow space across the length of said baffle, and each baffle extending completely across said stream and comprising two parallel spaced apart vertically extending baffle members connected together by a horizontally extending baffle member perpendicular thereto.

2. Apparatus as recited in claim 1 in which said two parallel spaced apart vertically extending baffle members are inclined with respect to the level of said stream.

3. Apparatus for removing a layer of oil floating on a substantially level unidirectional flowing stream of water from said stream comprising: a plurality of water impervious baffles connected together in a vertical arrangement; each baffle overlapping in a vertical plane a selected portion of an adjacent baffle to form a plurality of flow passageways between each baffle, each passageway defining a selected overflow space across the length of said baffle, and each baffle extending completely across said stream and comprising a semicylindrical baffle member, said adjacent overlapping semicylindrical baffle members having their open halves facing each other.

* * * * *